H. BROWN.
TRANSMISSION FOR AUTOMOBILES.
APPLICATION FILED MAY 7, 1917.
1,258,312.
Patented Mar. 5, 1918.
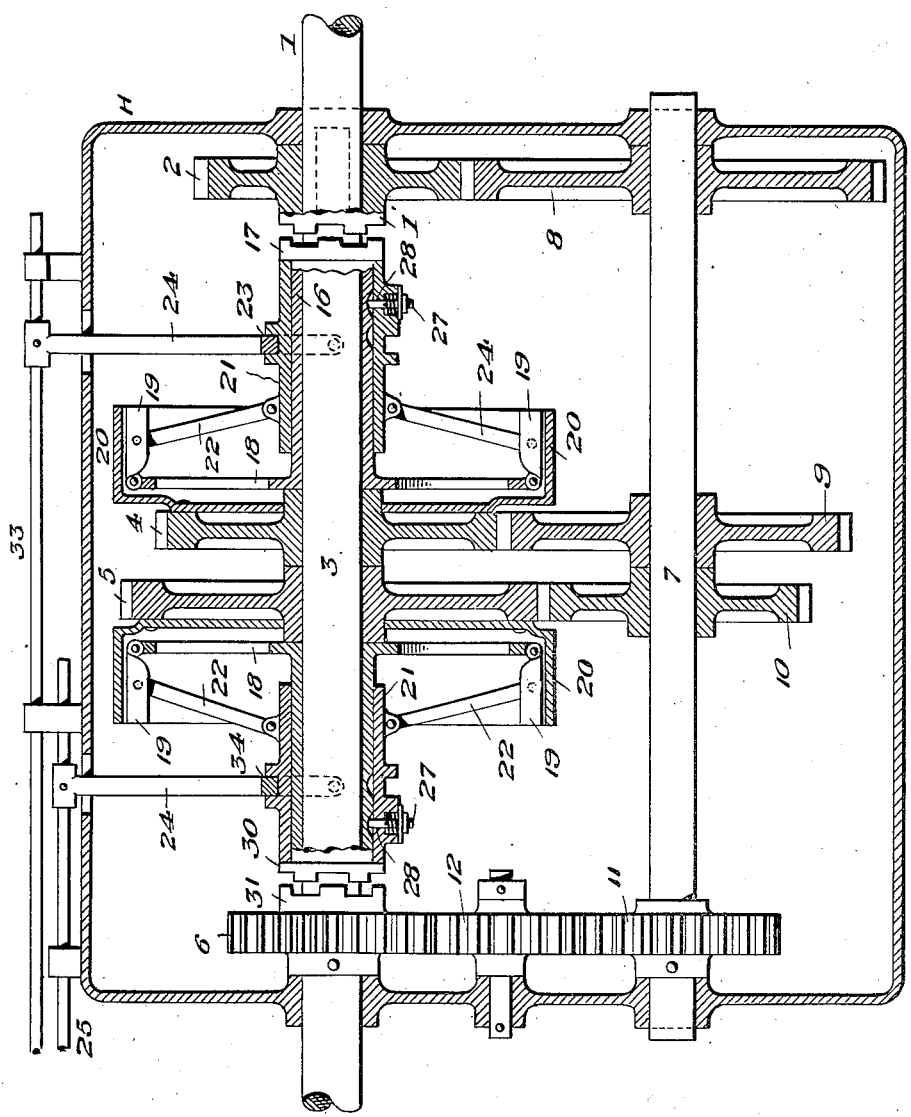
Inventor
Harold Brown
By Mason Fenwick & Lawrence Attorneys.

UNITED STATES PATENT OFFICE.

HAROLD BROWN, OF DACOMA, OKLAHOMA.

TRANSMISSION FOR AUTOMOBILES.

1,258,312.      Specification of Letters Patent.      Patented Mar. 5, 1918.

Application filed May 7, 1917. Serial No. 167,049.

*To all whom it may concern:*

Be it known that I, HAROLD BROWN, a citizen of the United States, residing at Dacoma, in the county of Woods and State of Oklahoma, have invented certain new and useful Improvements in Transmissions for Automobiles; and I do hereby declare the following to be a full, clear, and exact description of the invention, such as will enable others skilled in the art to which it appertains to make and use the same.

This invention relates to machine elements and more particularly to change speed gear transmission mechanism.

It is one of the objects of the present invention to provide a change speed gear mechanism, such for instance, as adaptable for use in motor vehicles, in which the elements are so coördinately arranged and combined that the variable speed gears from the driving shaft to the driven shaft are constantly intermeshed and thereby serve to obviate the requirements for relatively shifting one gear into mesh with another, thereby not only eliminating the undesirable noises created at the time that shifting gears are thrown into mesh, but also materially reducing the damage done to the intermeshed gears, owing to the fracture or stripping of the teeth of the gears when they are thrown into mesh.

Another object of the invention is to provide a variable or change speed gear mechanism in which there is provided a set of positive jaw clutches and also a set of friction clutch members, these being slidably engageable to be coupled to the transmission shaft of the gearing by means of a manually controlled device.

With these and other objects in view as will be made manifest in the following specification, one embodiment of my invention is described and illustrated herewith and in which illustration:

The drawing is a general plan view of the mechanism showing certain of the parts in sectional detail.

The present transmission gearing is shown as arranged within a suitable housing H which may be provided with appropriate bearings throughout to receive the several shafts of the gearing. At one end of the housing there is embodied a motor or driving shaft 1 having at its end within the housing a positive or jaw clutch 1' and carrying a suitable gear which may be either of the form of a common spur gear or provided with helical teeth as may be preferred. The inner end of the driving shaft 1 is telescopically fitted upon a transmission shaft 3 which has loosely mounted upon it an intermediate gear 4 closely adjacent to which there is also loosely mounted on the shaft a low speed gear 5 and at the opposite side of the housing there is loosely mounted upon the transmission shaft 3 a reverse gear 6. Extending parallel to the transmission shaft 3 and spaced at a suitable distance therefrom there is provided a jack shaft 7 running in suitable bearings in or upon the housing H and upon this latter shaft there is secured a gear 8 which is constantly in mesh with and is driven by the gear 2 of the driving shaft 1.

Keyed upon the jack shaft 7 is a gear 9 constantly meshing and driving the intermediate gear 4 and adjacent the gear 9 there is provided another gear 10 which in turn constantly intermeshes with and drives the low speed gear 5, while at the opposite end of the housing there is keyed on the jack shaft 7, a gear 11 constantly meshing with an idler gear 12, this in turn constantly intermeshing with the reverse gear 6 on the transmission shaft 3.

For the purpose of coupling the transmission shaft 3 to the driving shaft 1 and securing a high speed relation of the transmission shaft, there is slidably mounted upon the end of the transmission shaft adjacent to the clutch member 1ª, a sleeve 16 which carries a clutch member 17 to be coupled to the clutch member 1', the sleeve 16 being slidably splined on the transmission shaft 3 and on the opposite end of the sleeve there is mounted any suitable form of friction clutch structure.

In this illustration, the friction clutch member comprises a spider 18 having on its outer ends suitable friction clutch members 19 adapted to be thrown outwardly into frictional engagement with a clutch drum 20 which is secured in the adjacent face of the intermediate gear 4. For the purpose of shifting the clutch sleeve 16 axially along the transmission shaft 3, there is provided slidably upon the sleeve an exterior sleeve 21 having suitable connections, as by means of links 22 with the friction shoes or members 19 carried by the spider 18, this outer sleeve 21 carrying a ring 23 which is engaged by a yoke or arm 24 which extends transversely through the gear housing H and is adapted to be operated through the reciprocation of a manually or otherwise actuated shift rod 25. When the clutch ring 23 is shifted toward the friction clutch spider 18, the sleeve 21 is actuated so as to move the toggle or clutch links 22 outwardly and thus carry the friction members or shoes 19 into engagement with the drum 20 and thereby lock the gear 4 to the transmission shaft, power being transmitted to the gear 4 from its respective driving gear 9 on the jack shaft 7. By moving the operating member 33 to an intermediate position the shift rod 24 will slide the ring 23 with the sleeve 21 to an intermediate position and thus disconnect the friction clutch members of the gear 4 from operative engagement and thereby allow this gear to run free on the transmission shaft and when it is desired to positively connect the driving shaft clutch 1' to the transmission shaft, it is only necessary through the actuation of the member 33 to shift the ring 23 with the sleeve 21 along the sleeve 16 until it engages the clutch member 17 fixed thereon, and this latter is then shifted into positive interlocking engagement with the companion clutch 1' and thereupon causes direct connection between the driving shaft and the driven or transmission shaft 3. It is desirable that the friction clutch operating sleeve 21 be automatically locked temporarily in engagement with the jaw clutch sleeve 16 when the former has been shifted so as to carry the clutch member 17 into clutch engaging position and to that end any form of locking device may be employed. In this instance, there is provided adjacent the ring 23 a spring actuated detent 27, the point of which is adapted to enter and temporarily lock in an aperture or recess 28 provided therefor in the end of the sleeve 16 adjacent the clutch member 17. In operation, when the clutch member 17 is to be disengaged from its complementary member 1', the locking detent 27 causes the simultaneous movement of the sleeves 16 and 21, together along the shaft 3 by the actuation of the shifting rod 24 and its ring 23 until the end of the sleeve 16 adjacent the gear 4 abuts against the latter, whereupon further shifting movement of the sleeve 16 is prevented and thus the continued movement of the shifting ring 23 with its sleeve 21 causes the disengagement of the latch or detent 27 from its aperture 28 in the sleeve 16 and thus relative movement of the sleeve 21 on the sleeve 16 causes an outward thrusting of the toggle or compression links 22 to throw the friction shoes 19 into engagement with the drum 20 if this is desired.

A similar mechanism for providing for the coupling of the low speed gear 5 to the transmission shaft 3 is illustrated and like reference numerals applied to similar parts in this clutch controlling mechanism which latter includes a jaw clutch member 30 which is adapted to be shifted into positive locking interengagement with a complementary clutch member 31 which is secured on the adjacent face of the reverse gear 6. The clutch controlling sleeve 16 which actuates the jaw 30 is operated by a shift ring 34 to which is connected a shift rod or yoke 24, this in turn extending also to one side of the casing and is connected to a manually or otherwise operated link or lever 25 whereby the ring 31 controlling the clutch devices may be shifted so as to couple the positive clutch members 30 and 31 carried by the gear 5 with respective clutch members carried by the sleeve 16 on its respective side of the mechanism.

From the foregoing it will be seen that I have provided a change speed gear mechanism involving sets of gears, respective parts of which sets are constantly intermeshed and do not have relative shifting movement onto the other in order to secure change of speed, this latter change being obtained through the provision of suitable positive clutches and suitable friction clutches appropriately mounted or connected to the driving and the driven parts respectively, these clutches being manually controlled through a selective mechanism, whereby any of the clutches may be connected to the driving members of the shaft driven as may be desired.

What is claimed is:—

1. In transmitting mechanism, a gear member having a jaw clutch, a gear member having a friction clutch, said members coaxially alined, a shaft to be driven by either of said gear members, a sleeve splined on said shaft and having means complementary to said clutch members, and means on the sleeve for shifting said sleeve so as to selectively engage one or the other of said members, and a device for temporarily locking said sleeve and means.

2. In a change speed device, a transmission shaft having a loose gear, a sleeve shiftably splined on the shaft and having a jaw clutch on one end and a head at the other, friction means carried by the head, a clutch ring engaged by said means and attached to one gear, and a second sleeve splined on the other and operative to shift the inner sleeve in either direction and to cause the selective engagement of either clutch, said means connected to the outer sleeve.

3. In a change speed device, a transmission shaft having a loose gear, a sleeve shiftably splined on the shaft and having a jaw clutch on one end and a head at the other, friction means carried by the head, a clutch ring engaged by said means and attached to one gear, and a second sleeve splined on the other and operative to shift the inner sleeve in either direction and to cause the selective engagement of either clutch, said means connected to the outer sleeve, and a detent temporarily locking the said sleeves.

In testimony whereof I affix my signature.

HAROLD BROWN.